United States Patent
Cai

(10) Patent No.: US 7,457,609 B2
(45) Date of Patent: Nov. 25, 2008

(54) METHODS AND SYSTEMS FOR CONTROLLING SERVICES PROVIDED TO SHARED PLAN SUBSCRIBERS

(75) Inventor: Yigang Cai, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 379 days.

(21) Appl. No.: 11/261,342

(22) Filed: Oct. 28, 2005

(65) Prior Publication Data

US 2007/0099609 A1 May 3, 2007

(51) Int. Cl.
*H04M 11/00* (2006.01)

(52) U.S. Cl. .................... 455/405; 455/415; 455/435.1; 455/519

(58) Field of Classification Search ............... 455/414.1, 455/405, 466, 519, 415, 435.1
See application file for complete search history.

(56) References Cited

U.S. PATENT DOCUMENTS

| | | | |
|---|---|---|---|
| 5,884,193 | A | 3/1999 | Kaplan |
| 6,173,046 | B1 | 1/2001 | Jagadish et al. |
| 6,295,447 | B1 | 9/2001 | Reichelt et al. |
| 6,590,970 | B1 | 7/2003 | Cai et al. |
| 6,606,377 | B2 * | 8/2003 | Ruckart et al. .......... 379/121.02 |
| 6,862,342 | B1 | 3/2005 | Hua et al. |
| 6,917,671 | B1 | 7/2005 | Burg |
| 6,947,723 | B1 | 9/2005 | Gurnani et al. |
| 2002/0035479 | A1 | 3/2002 | Takae et al. |
| 2003/0014367 | A1 | 1/2003 | Tubinis |
| 2004/0088250 | A1 | 5/2004 | Bartter et al. |
| 2005/0027624 | A1 | 2/2005 | Cai |
| 2005/0069112 | A1 * | 3/2005 | Hlasny ....................... 379/126 |
| 2005/0096009 | A1 * | 5/2005 | Ackley ....................... 455/405 |
| 2005/0186974 | A1 | 8/2005 | Cai |
| 2006/0141994 | A1 * | 6/2006 | Fratti et al. ............... 455/414.1 |
| 2007/0037562 | A1 * | 2/2007 | Smith-Kerker et al. ...... 455/418 |

* cited by examiner

Primary Examiner—Vincent P. Harper
Assistant Examiner—Fred A Casca

(57) ABSTRACT

Methods and systems for controlled provision of communications services to shared plan subscribers, in which a shared plan defines individual restrictions for a plurality of subscribers, wherein services are selectively provided services to the shared plan subscribers based on subscriber usage and the corresponding individual restrictions defined for the shared plan.

12 Claims, 8 Drawing Sheets

FIG. 4B

SUBSCRIBER 1

- 310 — PHONE NUMBER AND OTHER INFORMATION
- 320 — AVAILABLE MINUTES RESTRICTIONS  ON ☒
  - ANYTIME MINUTES  300
  - AUDIBLE WARNING BEFORE ENDING SERVICE ?  NO ☐  YES ☒
  - OVERRIDE AVAILABLE ?  NO ☐  YES ☒
  - OVERRIDE CONDITIONS  1 ☒  ▼ 50% PERCENT OF TOTAL PLAN MINUTES REMAINING
  - 2 ☒  ▼ CALLING HOME
  - 3 ☐  ▼
- 330 — TIME-BASED RESTRICTIONS  ON ☒
  - AUDIBLE WARNING BEFORE ENDING SERVICE ?  NO ☐  YES ☒
  - RESTRICTED RANGE 1  ☒  ▼ DAY(S)  M☒ T☒ W☒ TH☒ F☒ SAT☐ SUN☐  ▼ HOURS  FROM ▼ 8:00 AM  TO ▼ 4:30 PM
  - TYPE OF RESTRICTION:
    - INCOMING ☒   OUTGOING ☒
  - OVERRIDE CONDITIONS
    - 1 ☒  ▼ CALLING HOME
    - 2 ☐  ▼ CALL FROM HOME
    - 3 ☐  ▼
  - RESTRICTED RANGE 2  ☒  ▼ DAY(S)  ▼ HOURS  ▼ MIN.

SUBSCRIBER 1

LOCATION-BASED RESTRICTIONS   ON ☒

AUDIBLE WARNING BEFORE ENDING SERVICE ?   NO ☐   YES ☒

RESTRICTION 1 ☒   ▼ ROAMING
- RESTRICTION FOR:   INCOMING ☒   OUTGOING ☒
- OVERRIDE CONDITIONS   1 ☒ ▼ CALLING HOME
- 2 ☒ ▼ 20 MIN. PER MONTH

RESTRICTION 2 ☒   ▼ LONG DISTANCE
- RESTRICTION FOR:   INCOMING ☒   OUTGOING ☒
- OVERRIDE CONDITIONS   1 ☒ ▼ CALLING HOME
- 2 ☐ ▼

RESTRICTION 3 ☒   ▼ LOCAL CALLS
- RESTRICTION FOR:   INCOMING ☐   OUTGOING ☒
- OVERRIDE CONDITIONS   1 ☒ ▼ CALLING HOME
- 2 ☒ ▼ 100 MIN. PER MONTH

RESTRICTION 4 ☒   ▼ INTERNATIONAL
- RESTRICTION FOR:   INCOMING ☒   OUTGOING ☒
- OVERRIDE CONDITIONS   1 ☒ ▼ CALLING HOME
- 2 ☐ ▼

FIG. 4D

SUBSCRIBER 1

SERVICE/CONTENT TYPE RESTRICTIONS  ON ☒

| AUDIBLE WARNING BEFORE ENDING SERVICE ? | NO ☐  YES ☒ |

RESTRICTION 1  ☒    ▼ 900 NUMBERS
RESTRICTION FOR:   INCOMING ☒  OUTGOING ☒
OVERRIDE CONDITIONS   1 ☐ ▼
                      2 ☐ ▼

RESTRICTION 2  ☒    ▼ SPECIFIC NUMBER
RESTRICTION FOR:   INCOMING ☒  OUTGOING ☒
OVERRIDE CONDITIONS   1 ☐ ▼
                      2 ☐ ▼

RESTRICTION 3  ☒    ▼ MOBILE-MOBILE
RESTRICTION FOR:   INCOMING ☒  OUTGOING ☒
OVERRIDE CONDITIONS   1 ☒ ▼ TO PLAN MEMBERS
                      2 ☐ ▼

RESTRICTION 4  ☒    ▼ SHORT MESSAGING
RESTRICTION FOR:   INCOMING ☒  OUTGOING ☒
OVERRIDE CONDITIONS   1 ☒ ▼ TO PLAN MEMBERS
                      2 ☐ ▼

RESTRICTED TIMES  ☒   ▼ DAY(S)   ▼ HOURS
  M ☒                  FROM ▼ 8:00 AM
  T ☒                    TO ▼ 4:30 PM
  W ☒
  TH ☒
  F ☒
  SAT ☐
  SUN ☐

METHODS AND SYSTEMS FOR CONTROLLING SERVICES PROVIDED TO SHARED PLAN SUBSCRIBERS

FIELD OF THE INVENTION

The invention relates to communications networks in general, and more particularly to methods and systems for controlling provision of services to shared plan subscribers.

BACKGROUND OF THE INVENTION

Modern wireless and wireline communications systems provide various types of services to customers, including normal calling, paging, messaging, internet access, etc., where the customer (sometimes referred to as a subscriber) is able to select from a wide range of calling plans for today's mobile phone. Most plans are either post-paid, in which services are provided in a given time period, with the customer being billed at the end of the billing period, or pre-paid type plans in which the customer must pay in advance to ensure communications services are available when subsequently needed. Service providers currently offer a number of calling plans designed to allow subscribers to select the types of services that will be available when using their mobile phone or phones. Most post-paid service plans offer either limited anytime minute plans, for instance, in which the subscriber may use 300, 500, 700, 1,000 minutes at a favorable price within a given billing period, typically a month, as well as unlimited plans. For post-paid plans offering limited anytime minutes, the subscriber can use up to the stated limit at a first rate (often included in a flat rate monthly base charge), after which further minutes are charged at a higher rate, with the bill reflecting any charges for exceeding the minutes limit. For pre-paid plans, the user can make calls until the account balance reaches zero, after which the phone will not work until the subscriber replenishes the account.

Shared plans or family plans are becoming popular, in which post-paid services are provided for a number of phones, with the costs being billed together. Such plans are typically directed to family groups, friends, small businesses, etc., where the plan holder is allowed to have multiple phones with multiple phone numbers. As with single user plans, the shared plans may also be provided with unlimited minutes or with a limited number of total anytime minutes for the group as a whole, with overages being reflected on the bill at the end of the month. In many group situations, however, one or a few shared plan members use the majority of the available minutes, with the plan account often incurring excess charges with no control over the overall group usage and no indication of excessive phone use by certain members until the bill is received. For example, teenage children often use all the available minutes in a family plan, with the parents having no way to limit the child's minutes without also unduly limiting their own ability to make calls. Accordingly, there is a need for improved communications service plans and call control techniques by which customers can be provided with more convenient shared service plans.

SUMMARY OF THE INVENTION

A summary of one or more aspects of the invention is now presented to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The invention is related to real time mobile shared plan call control techniques and systems which can be implemented in existing communications networks to provide individually definable limits or restrictions for different shared plan subscribers or members. The invention thus allows parents, business managers, or other shared plan principles to set different caps or limits for individual plan members to allow reasonable service availability to all members with usage by certain members being subject to limits with respect to available minutes, time of day, days of the week, location, and service or content type. The invention thereby facilitates mobile plan call control that may be implemented in association with post-paid or pre-paid billing arrangements to enhance the flexibility provided to subscribers of shared plan services.

In accordance with one or more aspects of the present invention, a method is provided for controlling services provided to two or more shared plan subscribers having a shared account. The method includes establishing a shared plan that defines individual restrictions for the subscribers, including first and second sets of restrictions or limitations to be applied to first and second shared plan subscribers. The method further comprises selectively providing services based on subscriber usage data and the corresponding individual restrictions defined for the shared plan subscribers. The shared plan may individually define available minutes restrictions and one or more time-based, location-based, and/or service/content type restrictions for each subscriber wherein at least one subscriber, such as a parent, can modify the individual restrictions defined for the shared plan. The restriction types may be interdependent, for instance, with time range limits being placed on certain types of content, such as prohibiting calls from certain friends during school hours, etc.

The selective provision of services may include monitoring service attempts relative to subscribers in the shared plan, with usage data and a corresponding set of restrictions being obtained from a plans database for service attempts associated with a particular subscriber to determine whether the attempted service is allowed, and if so, to determine if there are any further caps or limits to the service. Moreover, provided services may thereafter be discontinued, for instance, where a minutes limit is reached, or a time range restriction is violated, with the subscriber optionally being provided with an audible warning or announcement prior to discontinuation of the service, indicating that the service is not allowed. Furthermore, the restrictions for a first subscriber may be contingent or conditional with respect to usage of a second subscriber or another type of restriction. In this regard, one or more of a first set of restrictions for a first subscriber may include a condition relative to the second subscriber or to the plan as a whole, with service attempts associated with the first shared plan subscriber being selectively provided based on the first set of restrictions, the first usage data, and the second usage data. The method may further include updating usage data for the shared plan and generating call data records for the shared account based on the services actually provided.

Further aspects of the invention relate to a call control system that controls the provision of communications services to shared plan subscribers. The system can be implemented as standalone application logic, or may be integrated in to hardware, software, or other logical entity operatively associated with a communications system, such as an application in a communications network server or other platform, where the call control system provides a subscriber account manager component and a rule engine or logic component. The subscriber account management system stores the shared plan that defines the individual restrictions for a plurality of plan subscribers, and the rule engine selectively provides services to the subscribers based on the usage data and the corresponding individual restrictions defined in the shared plan. The network detects service attempts related to the shared plan subscribers and notifies the rule engine, which then obtains the corresponding set of restrictions and usage data from the subscriber account management system. The rule engine determines whether the service is allowed based on the set of restrictions and the usage data, and if so, allows the network to provide (or continue) the attempted service to the subscriber within any limits imposed by the restrictions and the usage data. If the service is not allowed, or thereafter exceeds one or more of the limits/restrictions, the rule engine causes the network to provide an announcement to the first shared plan subscriber and to deny or discontinue the service.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which:

FIGS. 4B-4D are schematic diagrams illustrating further details of a first list of restrictions in the shared calling plan of FIG. 4A.

DETAILED DESCRIPTION OF THE INVENTION

Figure 1:
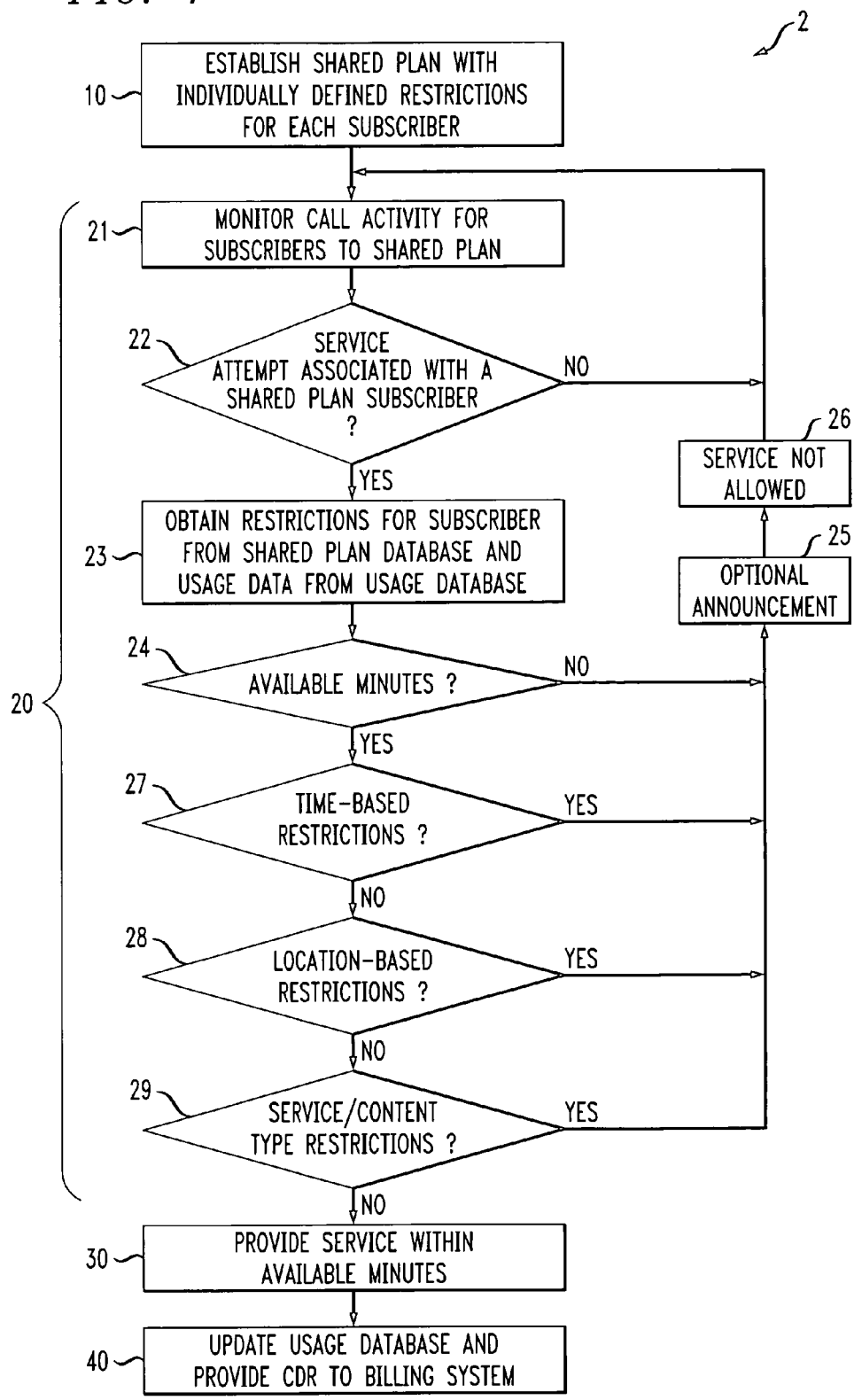
FIG. 1 is a flow diagram illustrating an exemplary method for controlling services provided to two or more shared plan subscribers in accordance with various aspects of the invention.
Figure 2:
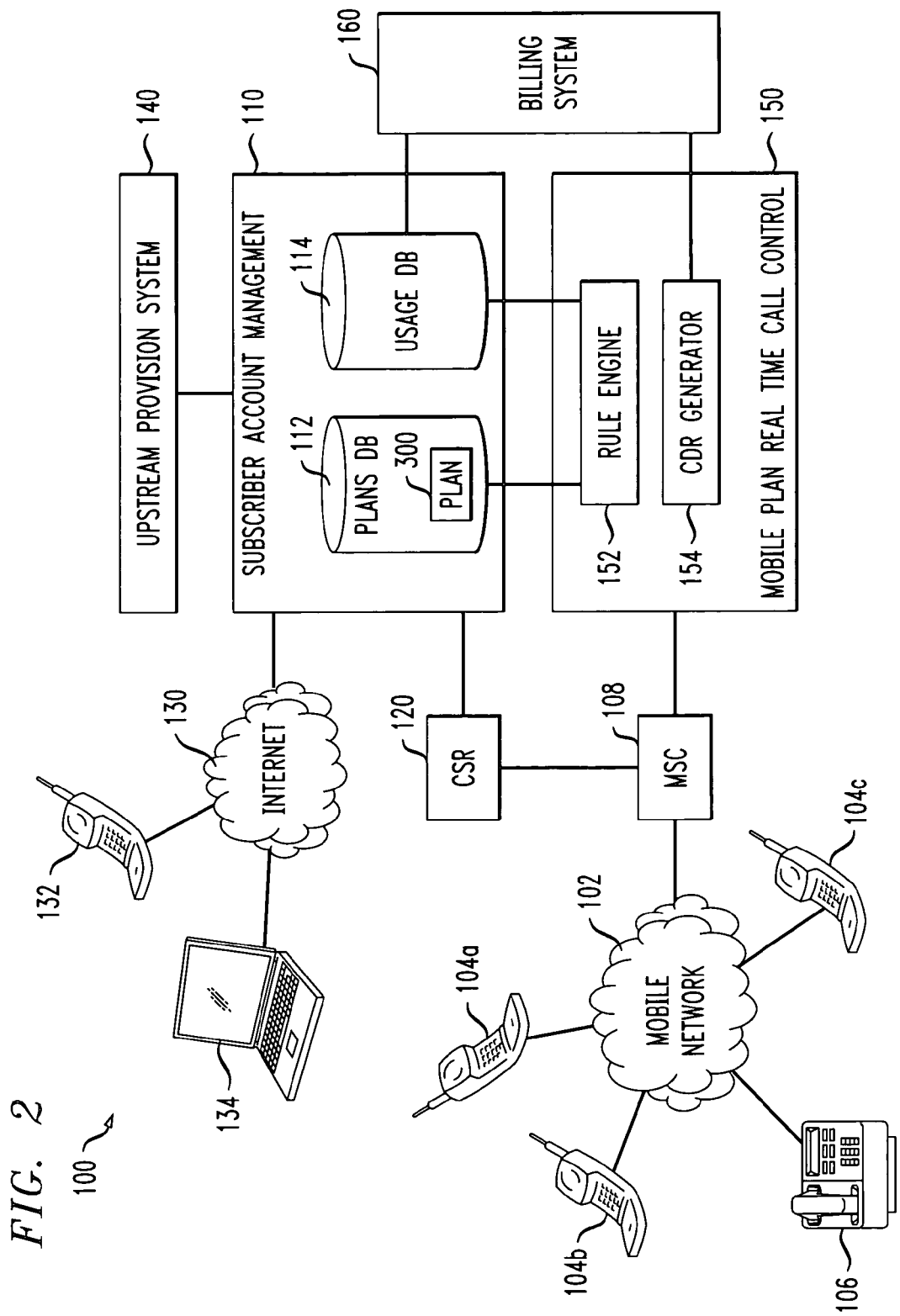
FIG. 2 is a system diagram illustrating an exemplary communications system including a mobile plan call control system with a rule engine according to further aspects of the invention.

Referring initially to FIGS. 1 and 2, a method 2 is illustrated in FIG. 1 for controlling service provision to shared plan subscribers according to one or more aspects of the invention. Although the method 2 is illustrated and described hereinafter as a series of acts or events, it will be appreciated that methods of the invention are not limited by the illustrated ordering of such acts or events. In this regard, some acts or events may occur in different orders and/or concurrently with other acts or events apart from those illustrated and described herein, in accordance with the invention. It is further noted that not all illustrated steps may be required to implement a process in accordance with the present invention. The methods of the invention, moreover, may be implemented in association with the illustrated communications system 100 of FIG. 2 using any suitable interconnection of components, messages, and user equipment, as well as with other systems and apparatus not illustrated or described. The inventive methods may be implemented in any suitable fashion, including hardware, software, or combinations thereof, wherein all such alternatives are contemplated as falling within the scope of the invention and the appended claims.

The method 2 includes establishing a shared plan at 10 that defines individual restrictions for two or more subscribers to the shared plan. Any technique may be used at 10 for establishing or otherwise configuring the shared plan within the scope of the invention, wherein one or more plan subscribers may be allowed to modify the individual restrictions defined for the shared plan. As shown in FIGS. 4A-4D below, the plan 300 can include any integer number N lists 302 for corresponding subscribers, where N is an integer greater than 1, where the plan provides a first set of restrictions for a first subscriber and a second set of restrictions for a second subscriber. In the illustrated method 2 of FIG. 1 and the system 100 of FIG. 2, the shared plan 300 individually defines restrictions with respect to available minutes, as well as time-based, location-based, and service/content type restrictions for each subscriber to the shared plan. However, all such restriction types need not be provided, wherein other implementations are possible where the plan provides available minutes restrictions along with one or more of time-based, location-based, and service/content type restrictions for each subscriber. In the illustrated embodiments, moreover, the shared service plans 300 are provisioned and stored at 10 in a plans database 112 of a subscriber account management system 110 (SAM), as best shown in the communications system 100 of FIG. 2.

The mobile plan 300 can be provisioned through an upstream provision system 140 such as service management system (SMS) in an intelligent network, or by any other suitable means. The mobile plans can also be view and updated by a customer service representative 120 (CSR) or subscribers themselves using their mobile phones 104a, 104b via a mobile network 102 and a mobile switching center 108 (MSC), or through the Internet 130 via a computer 134 or mobile device 132. One or more privileged subscribers, such as a parent in a family plan 300 can access their mobile plan 300 through their plan cell phone 104b or via the Internet 130 using a suitable subscriber ID and a pass code. The subscriber account manager system 110 also maintains subscriber minutes usage data or information in a usage database 114 which is operatively associated with a billing system 160 to implement the plans 300 in pre-paid or post-paid fashion. In one embodiment, the billing system 160 generates post-paid invoices for the plan account based on usage of mobile plan by all the subscriber members (e.g., a family, a business, a group or friends, etc.). In the example of FIG. 2, two mobile phones 104a and 104b are shown for a child and a parent in the shared plan 300, where the first phone 104a corresponds to the first subscriber (daughter) and the second phone 104b is for the second subscriber (parent). The phones 104a and 104b are able to communicate with one another and other non-member devices, such as a phone 106 and other networks via the mobile network 102 and one or more corresponding MSCs 108, wherein a third mobile phone 104c is shown in FIG. 2 corresponding to a non-plan member friend of the first (child) subscriber.

In accordance with further aspects of the invention, moreover, the system 100 of FIG. 2 also includes a mobile plan real time call control system 150 (MPCC) with a rule engine 152 that controls the provision of communications services to shared plan subscribers and a call detail records (CDR) generation system 154. The control system 150 can be implemented as standalone application software or hardware or combinations thereof which is operatively associated with other components of the communications system 100, or may be integrated as an application in a communications network server or other platform, and includes a rule engine or logic component 154 operatively coupled with a subscriber account manager (SAM) component or system 110, in this case, an application in a network server. The subscriber account management system 110 stores the shared plan 300 that defines the individual restrictions for a plurality of plan subscribers, and the rule engine 152 selectively provides services to the subscribers based on the usage data from the database 114 and on the corresponding individual restrictions defined for the shared plan 300.

At 20 and 30 in the method 2 of FIG. 1, services are selectively provided based on the subscriber usage data and the corresponding individual restrictions defined for the shared plan 300. In the illustrated embodiment, service attempts (call activity) are monitored at 21 relative to the shared plan subscribers and checked at 22 to ascertain whether a current service attempt is associated with a shared plan subscriber. If not (NO at 22), the call activity is again monitored at 21. In the exemplary system 100 of FIG. 2, the MSC 108 identifies the shared plan related activity at 21 and 22 by analyzing the calling and called party numbers for all call activity. When a match is found (YES at 22 in FIG. 1), restrictions for the corresponding subscriber are obtained at 23 from the shared plan 300 in the plans database 112, and usage data is obtained from the usage database 114. In FIG. 2, for example, the MSC 108 sends a request to the mobile plan call control system 150 when a plan subscriber has been identified as being associated with the current service attempt. The MPCC 150 queries the plans database 112 to retrieve the corresponding shared mobile plan 300 and also obtains the current subscriber usage information from the usage database 114.

The method 2 of FIG. 1 then proceeds to 24, and 27-29 to determine whether the services are allowed based on the restrictions in the plan 300 and the usage data. In the system 100, the rule engine 152 evaluates the usage data and the plan restrictions for the corresponding mobile subscriber, and returns a decision to the MSC 108 regarding whether the services are to be provided, and if so, under what further limitations (e.g., maximum length of the call, etc.). A determination is made at 24 in FIG. 1 as to whether there are sufficient available minutes remaining for the designated subscriber to the shared plan. If not (NO at 24), an announcement may optionally be provided to the subscriber at 25, and the service is denied at 26, whereafter the method 2 proceeds again to monitor the call activity at 21 as described above. In the exemplary system 100, the rule engine 152 causes the network 102 to provide the announcement to the shared plan subscriber and to deny or discontinue the service, in this case, due to the available minutes restrictions for the corresponding plan subscriber. If there are available minutes (YES at 24), further restrictions are evaluated, with a determination being made at 27 as to whether any time-based restrictions apply. If so (YES at 27), an announcement may be provided at 25 and the service is denied at 26 as described above.

If there are remaining minutes and no time-based restrictions (NO at 27), the method 2 proceeds to 28, where a determination is made as to whether location-based restrictions apply to the attempted service. If so (YES at 28), the service is disallowed with an optional announcement at 25, 26, and the method 2 returns to monitoring as described above. Otherwise (NO at 28), a determination is made at 29 as to whether service/content type restrictions apply to the service attempt. If so (YES at 29), the method 2 proceeds to 25, 26, and 21 as described above (service not provided), and if not (NO at 29), the service is provided at 30 subject to any restrictions, such as available minutes caps, continued monitoring of time-based or location-based restrictions, etc. In addition, the usage database 114 is updated and call data records (CDR) are generated at 40 and provided to the billing system 160 by the CDR generator 154 of the MPCC 150. In the above described manner, the MPCC 150 selectively instructs the MSC 108 of the mobile network 102 to provide the requested service to the designated subscriber depending on various time restrictions, available minutes, calling party or called party locations, origination/termination numbers or other service/content type restrictions, etc., that have been set for the shared plan 300.

Figure 3:
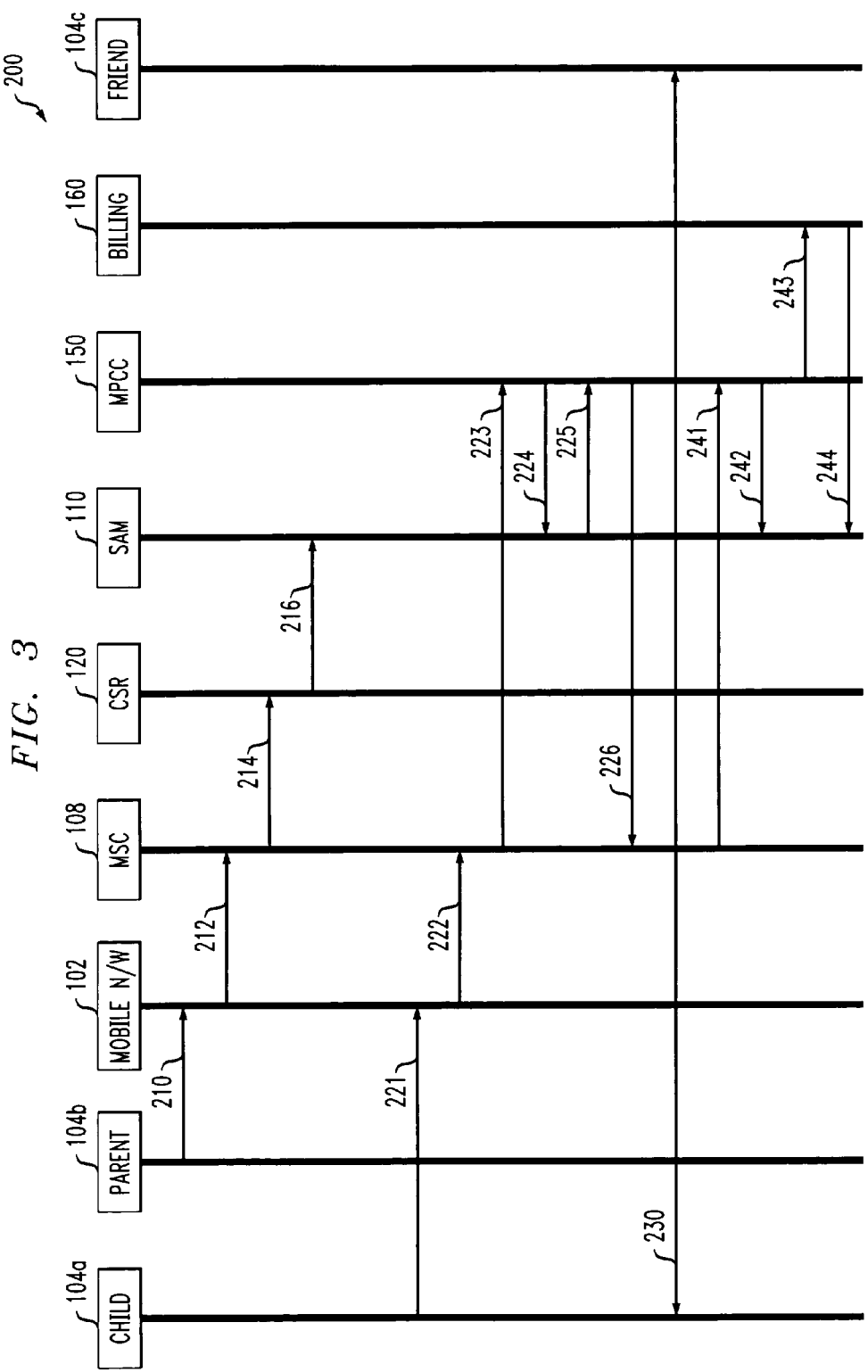
FIG. 3 is a call flow diagram illustrating a parent subscriber configuring a shared plan in the system of FIG. 2 and a child subscriber thereafter attempting to call a friend with the system implementing call control techniques of the invention.

Referring also to FIGS. 3-4D, a simplified call flow diagram 200 is provided in FIG. 3 to further illustrate operation of the system 100 and the method 2 in the context of a pre-paid shared call plan including a child subscriber (cell phone 104a in FIG. 2) and a parent subscriber (phone 104b). In this example, the parent sets the restrictions for the plan 300, in particular the restrictions placed on the child subscriber's use of phone 104a, and thereafter the child places a call to a friend at phone 104c. As shown in the call flow 200, the parent places a call 210 in the mobile network 102, for instance, by dialing a toll-free access number designated by the mobile service provider for the shared plan 300. The call is directed to the customer service representative 120 via the network 102 (212 in FIG. 3) and the MSC 108 (214), in order to establish or adjust the shared plan 300 with respect to the child subscriber restrictions. In one example, the family plan 300 provides a total of 1,000 anytime minutes, where the parent would like to restrict or limit the child's phone number to an individual minute plan of 300 minutes in a given month. In another possible implementation, the parent may modify the plan 300 via the Internet 130. In either case, the parent may provide certain information, such as plan number and a pass code to verify authority to modify the plan settings. The service representative 120 verifies the account information and modifies the plan data 300 (216) in the subscriber account management system 110, in this example, to restrict the child's phone 104a to 300 anytime minutes, with an override condition specifying that the child phone 104a may exceed the 300 minute cap to call home or for other calls while 50 percent of the total shared plan minutes remain unused. In this manner, the parent may set the restrictions and conditions for services with respect to one, some, or all of the plan phones, where the initial establishment of the plan 300 includes defining the permission levels and pass codes to allow one or more plan subscribers (e.g., parents, managers, etc.) to modify the plan settings, while other subscribers (e.g., child subscribers, employees, etc.) cannot change the plan 300.

Figure 4A:
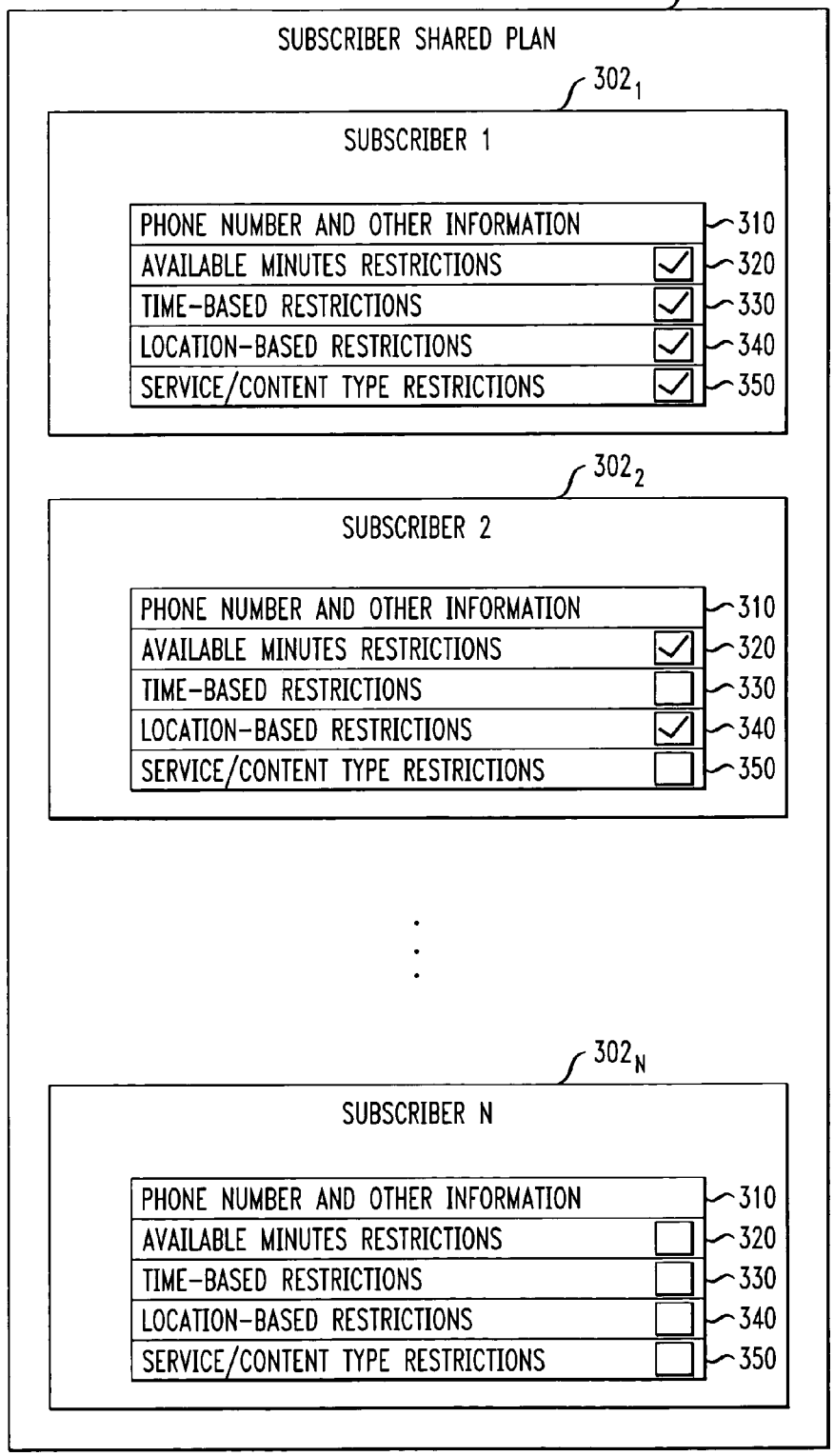
FIG. 4A is a simplified schematic diagram showing an exemplary individually configurable shared calling plan stored in a plans database in the system of FIG. 2, having a plurality of individual restrictions lists for corresponding shared plan subscribers.

FIG. 4A illustrates the exemplary individually configurable shared calling plan 300 stored in the plans database 112 in the system of FIG. 2 having a plurality of individual restrictions lists 302 for corresponding shared plan subscribers. As shown in FIG. 4A, the plan 300 can have any integer number N individual restrictions lists 302, where N is an integer greater than 1. FIG. 4A shows exemplary first, second, and Nth lists $302_1$, $302_2$, and $302_N$, respectively, each of which includes phone number and other information 310 for the corresponding shared plan subscriber, as well as selectable and individually definable available minutes restrictions 320, time-based restrictions 330, location-based restrictions 340, and service/content type restrictions 350. The information 310 may include numeric numbers, such as the subscriber telephone number, as well as other relevant indicators, such as email address(es), IP address(es), Instant Message user name(s), etc. In the illustrated embodiment, the listed restrictions 320-350 are logically ORed together, wherein if any conditional restriction is determined to be satisfied by the rules engine 152 for a given subscriber, the attempted service will be refused or discontinued (subject to the specified conditions in the corresponding list 302).

FIGS. 4B-4D illustrate further details of the exemplary first list of restrictions $302_1$ in the shared calling plan 300 of FIG. 4A, where FIG. 4B illustrates exemplary portions of the available minutes and time-based restrictions 320 and 330, respectively, for the first (child) subscriber in the family plan 300. In this example, the parent subscriber has enabled available minutes restrictions 320 and has set an anytime minutes cap or limit of 300 minutes per month. With respect to the listed restrictions, moreover, one, some or all the restriction definitions or settings in the plan 300 may include conditions, such as override conditions. In the illustrated first restrictions listing $302_1$, such conditions may be defined for the available minutes restrictions 320, in this case including override conditions allowing the child subscriber to exceed the 300 minutes limit if certain conditions are met. In this example, override conditions include allowing the child to exceed the 300 minutes limit so long as 50 percent of the total plan minutes remain unused (e.g., 500 minutes remain unused for the entire family plan 300), and the child may also call home regardless of the number of anytime minutes used. In this manner, the first list of restrictions $302_1$, is interdependent on the usage data for the second subscriber as well as the child's usage, wherein the rule engine 152 may obtain both the first restrictions list $302_1$, and the first and second usage data in determining whether a particular child service attempt is allowed. Moreover, the restrictions in the list $302_1$ are interdependent with respect to the different types of restrictions, where the groupings of restriction types are merely exemplary. In this regard, the available minutes restrictions in list $302_1$, include service type conditions, in this case, based on the called party number, wherein the child can call home regardless of the current remaining minutes totals. Moreover, the parent subscriber may selectively decide whether the child subscriber will receive an audible warning announcement before ending or refusing a particular service request based on the remaining minutes restrictions 320. Other available minutes restrictions 320 are possible, including but not limited to limits for personal use, limits for business use (e.g., calls to a company enterprise virtual private network (VPN), etc.), peak time minutes restrictions, etc., wherein the illustrated examples are not exhaustive of the possible available minutes restrictions 320 falling within the scope of the invention.

FIG. 4B also shows exemplary time-based restrictions 330 in the first list $302_1$, which also allows the parent subscriber to select whether the child subscriber is provided with an announcement before ending or refusing a service attempt based on the time-based restrictions 330. In this example, moreover, one or more restricted ranges may be defined in the plan 300 for which the child subscriber is not allowed to send or receive calls, where the definable ranges also allow individual restrictions based on either or both of incoming and output going calls. In the illustrated example, the parent subscriber has defined a first restricted range to prohibit any calls from 8:00 AM through 4:30 PM on weekdays, for instance, to prevent the child from using the cell phone 104a during school hours. One or more override conditions may also be specified for each time-based restriction range, for example, where the child may be allowed to call home and is allowed to receive calls from home during the first time restriction range.

Any number of such time-based restriction ranges 330 may be defined in the list $302_1$, with corresponding conditions as desired by the parent subscriber. Other time-based restrictions 330 are possible within the scope of the present invention, including but not limited to certain days of the week, certain months of the year, certain times of day (e.g., no calling from 10:00 PM to 6:00 AM), predefined school/work hours defined with associated limits and restrictions, peak time limits/restrictions, etc, where the illustrated time-based restrictions 330 are merely examples.

Continuing in FIG. 4C, the list $302_1$, also provides one or more user definable location-based restrictions 340. Several examples are shown in FIG. 4C, including limitations on roaming, long distance, local, and international calling services, although other restrictions 340 can be specified in accordance with the invention, which may be applied based on the location of the calling party and/or the location of the called party. Moreover, as with the above available minutes and time-based restrictions 320 and 330, the parent subscriber may specify whether an audible warning is provided prior to refusing or discontinuing the restricted service based on location restrictions 340. In addition, various conditions can be defined for each location-based restriction. The parent subscriber in the illustrated example has allowed the child subscriber to call home despite any of the four illustrated location-based restrictions (via override conditions in FIG. 4C). Also, the child can make up to 20 minutes of roaming calls per month as shown in the specified override conditions. Furthermore, the parent has decided in this case to restrict the child to 100 minutes of outgoing local calls per month.

FIG. 4D shows several exemplary service/content type restrictions 350 defined by the parent for the first restrictions list $302_1$, in which restrictions and associated override conditions are specified for 900 numbers, other specific telephone numbers, mobile-to-mobile calls, and short messaging services. Many other service type restrictions and/or content type restrictions may be specified in the list $302_1$, including but not limited to individual restrictions for incoming and/or outgoing calls with respect to specific numbers (e.g., no calls to or from certain individuals, no 900 calls, mobile-to-mobile limits/restrictions, restrictions regarding conference calling, call waiting, caller ID services, downloading music or movies, access to specific websites, restrictions regarding access to specified content types (e.g., the child subscriber may be allowed to download the weather and music, but is not allowed to download movies or pornography, etc.), gaming and/or gambling (e.g., the child may be allowed to access gaming sites but is restricted from access to gambling content), etc., where the illustrated restrictions 350 are merely examples. In this regard, the shared plan 300 may be applicable to other services beyond voice calling, including but not limited to packet call data, IP multimedia subsystem (IMS) calls, web based services, etc., wherein the restrictions can be defined in the lists 302 in terms of restrictions of specific web sites, IP addresses, etc.

Returning to the call flow diagram 200 of FIG. 3, with the shared plan 300 established or modified by the parent subscriber at 210-216, the MSC 108 and the call control system 150 thereafter scrutinize call activity relative to the parent and child subscribers, and consult the restrictions lists 302 in selectively deciding which attempted services are allowed and which are denied or discontinued. For example, during a given billing period (month), a call is placed from the child subscriber phone 104a to a friend's phone 104c using the mobile network 102 (221 in FIG. 3), and the call is routed to the MSC 108 (222). The MSC 108 identifies the calling party phone 104a as belonging to the family plan 300 through digits analysis, and queries the MPCC 150 (223). The rule engine 152 of the control system 150 obtains the plan details (or the relevant listing 302₁, thereof) as well as usage data from the subscriber account management system 110 (224 and 225). In this example, with the limits restriction set at 300 minutes for the child subscriber phone 104a, the current usage data for the child indicates that 220 minutes have already been used, leaving 80 minutes remaining. The rule engine 152 also checks the other listed restrictions and determines that there are no other restrictions for this particular service attempt, and returns a response 226 to the MSC 108 with an instruction that the child subscriber is allowed to place the call up to a limit of 80 minutes (no override condition in this case, since the call is to the friend's phone 104c and not to home). The MSC 108 accordingly connects the call 230 between the child 104a and the friend 104c. One of the parties 104a, 104c then hangs up after 45 minutes, and the MSC 108 records a timestamp and reports the call end data to the MPCC 150 (241). The rule engine 152 of the MPCC 150 determines that the completed call was within the remaining 80 minutes and that 35 minutes remain for the child phone 104a, and accordingly updates the usage database 114 of the SAM 110 (242), wherein the CDR generator 154 provides call data records to the billing system 160 (243). The billing system 160, in turn, receives the CDR from the MPCC, synchronizes the usage data with the SAM 110 (244) and then generates an invoice.

Figure 5:
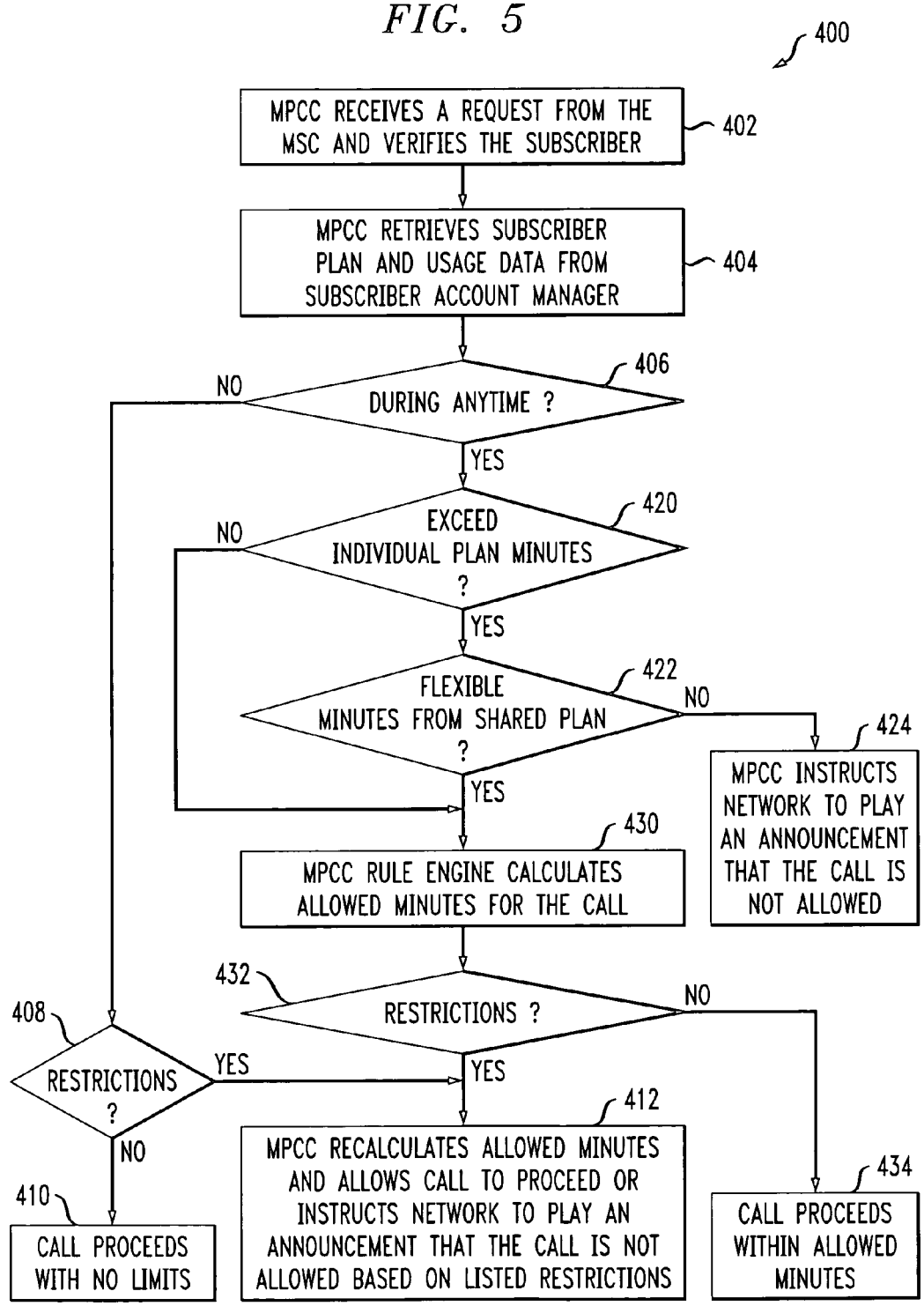
FIG. 5 is a detailed flow diagram illustrating operation of the rule engine in the mobile plan call control system of FIG. 2.

FIG. 5 provides a detailed flow diagram 400 further illustrating the operation of the MPCC rule engine 112 of FIG. 2, wherein the MPCC 150 receives a request from the MSC 108 at 402 and verifies the identity of the subscriber as belonging to a shared plan with individually definable restrictions. At 404, the MPCC 150 retrieves the subscriber plan 300 and usage data from the SAM 110 and determines at 406 whether the service attempt is during anytime minutes. If not (NO at 406), a determination is made at 408 as to whether any listed restrictions apply for the corresponding subscriber, such as calling or called party numbers, content/service types, time or location-based restrictions, etc. If not (NO at 408), the call proceeds at 410 with no limits, and otherwise, the MPCC 150 recalculates the allowed minutes at 412 and allows the call to proceed, or alternatively disallows the call and optionally instructs the network to play an announcement to the subscriber based on the restrictions.

If the call attempt is during anytime minutes (YES at 406), a determination is made at 420 as to whether the attempted services would exceed the plan minutes. If so (YES at 420), a determination is made at 422 as to whether flexible minutes may be used from the shared plan total (e.g., as in the above example Where the child subscriber phone 104a can use extra minutes so long as the total plan has 50 percent remaining). If not (NO at 422), the MPCC 150 instructs the network at 424 to announce the restriction to the subscriber and disallows the call. Otherwise, if the attempt does not exhaust the plan minutes (NO at 420) or if the call can be made using flexible plan minutes (YES at 422), the MPCC rule engine 152 calculates the amount of allowed minutes for the call at 430 and determines whether any listed restrictions apply at 432. If so (YES at 432), the MPCC 150 recalculates the allowed minutes at 412 and allows the call to proceed, or alternatively disallows the call and the network announces the restriction to the subscriber based. Otherwise (NO at 432), the call proceeds at 432 within the allowed minutes remaining.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. In a communication system, a method for controlling services provided to a plurality of shared plan subscribers having a shared account, the method comprising:
    establishing a shared plan defining individual restrictions for a plurality of subscribers to the shared plan, the shared plan comprising a first set of restrictions for a first subscriber to the shared plan, and a second set of restrictions for a second subscriber to the shared plan; and
    selectively providing services to the shared plan subscribers based on subscriber usage data and the corresponding individual restrictions defined for the shared plan;
    wherein selectively providing services to the shared plan subscribers based on the corresponding individual restrictions defined for the shared plan comprises:
        monitoring service attempts relative to subscribers to the shared plan;
        for service attempts associated with the first shared plan subscriber, obtaining the first set of restrictions from a plans database, obtaining first usage data associated with the first shared plan subscriber from a usage database, and determining whether the service is allowed based on the first set of restrictions and the first usage data; and
        if the service is allowed, providing the service to the first shared plan subscriber within any limits imposed by the first set of restrictions and the first usage data; and
    wherein at least one of the first set of restrictions includes a condition relative to the second subscriber to the shared plan, wherein for service attempts associated with the first shared plan subscriber, selectively providing services further comprises obtaining second usage data associated with the second shared plan subscriber from the usage database, and determining whether the service is allowed based on the first set of restrictions, the first usage data, and the second usage data.

2. The method of claim 1, further comprising providing an announcement to the first shared plan subscriber and denying or discontinuing the service if the service is not allowed.

3. The method of claim 1, wherein at least one subscriber to the shared plan can modify the individual restrictions defined for the shared plan.

4. The method of claim 1, wherein the shared plan individually defines available minutes restrictions and at least one of time-based restrictions, location-based restrictions, and service/content type restrictions for each subscriber to the shared plan.

5. In a communications system, a control system for controlling communications services provided to a plurality of subscribers to a shared plan, the control system comprising:
- a subscriber account management system that stores a shared plan defining individual restrictions for a plurality of subscribers to the shared plan, the shared plan comprising a first set of restrictions for a first subscriber to the shared plan and a second set of restrictions for a second subscriber to the shared plan, the subscriber account management system further storing usage data for the plurality of subscribers to the shared plan; and
- a rule engine operatively coupled with a network of the communications system and with the subscriber account management system, the rule engine being operative to selectively provide services to the subscribers to the shared plan based on the usage data and based on the corresponding individual restrictions defined for the shared plan;

wherein the rule engine is operative to monitor service attempts relative to subscribers to the shared plan;

wherein the rule engine is operative for service attempts associated with the first shared plan subscriber to obtain the first set of restrictions from a plans database, to obtain first usage data associated with the first shared plan subscriber from a usage database, and to determine whether the service is allowed based on the first set of restrictions and the first usage data;

wherein the rule engine is operative if the service is allowed to provide the service to the first shared plan subscriber within any limits imposed by the first set of restrictions and the first usage data; and wherein at least one of the first set of restrictions includes a condition relative to the second subscriber to the shared plan, wherein for service attempts associated with the first shared plan subscriber, the rules engine is operative to obtain second usage data associated with the second shared plan subscriber from the usage database, and to determine whether the service is allowed based on the first set of restrictions, the first usage data, and the second usage data.

6. The control system of claim 5, wherein the network is operative to detect service attempts relative to subscribers to the shared plan and to notify the rule engine of the service attempts, wherein for service attempts associated with the first shared plan subscriber, the rule engine obtains the first set of restrictions and first usage data associated with the first subscriber from the subscriber account management system and determines whether the service is allowed based on the first set of restrictions and the first usage data, and if so, allows the network to provide the service to the first shared plan subscriber within any limits imposed by the first set of restrictions and the first usage data.

7. The control system of claim 6, wherein if the service is not allowed based on the first set of restrictions and the first usage data, the rule engine causes the network to provide an announcement to the first shared plan subscriber and to deny or discontinue the service.

8. The control system of claim 6, wherein at least one subscriber to the shared plan can modify the individual restrictions defined for the shared plan.

9. The control system of claim 5, wherein the subscriber account management system allows at least one subscriber to the shared plan to modify the individual restrictions defined for the shared plan.

10. The control system of claim 5, wherein the subscriber account management system updates usage data for the shared plan, further comprising a call detail records (CDR) generation system operatively coupled with the network that generates call data records for the shared account.

11. The control system of claim 5, wherein the shared plan individually defines available minutes restrictions and at least one of time-based restrictions, location-based restrictions, and service/content type restrictions for each subscriber to the shared plan.

12. A system for controlling communications services provided to a plurality of subscribers to a shared plan, comprising:
- means for storing a shared plan defining individual restrictions for a plurality of subscribers to the shared plan; and
- means for selectively providing services to the subscribers to the shared plan based on the corresponding individual restrictions defined for the shared plan;

wherein the means for selectively providing services comprises:
- means for monitoring service attempts relative to subscribers to the shared plan;
- for service attempts associated with the first shared plan subscriber, means for obtaining a corresponding first set of restrictions from a plans database, means for obtaining first usage data associated with the first shared plan subscriber from a usage database, wherein at least one of the first set of restrictions includes a condition relative to the second subscriber to the shared plan, means for obtaining second usage data associated with a second shared plan subscriber from the usage database, and means for determining whether the service is allowed based on the first set of restrictions, the first usage data, and the second usage data; and
- if the service is allowed, means for providing the service to the first shared plan subscriber within any limits imposed by the first set of restrictions and the first usage data.

* * * * *